United States Patent [19]

Tamez et al.

[11] Patent Number: 4,662,805
[45] Date of Patent: May 5, 1987

[54] LOCKING LOAD BAR CARRIER AND METHOD

[76] Inventors: Carlos Tamez; Miguel P. Castaneda, both of 3739 Mayland, Baldwin Park, Calif. 91706

[21] Appl. No.: 793,856

[22] Filed: Nov. 1, 1985

[51] Int. Cl.⁴ .......................... E05B 73/00; B60P 7/12
[52] U.S. Cl. ...................... 410/33; 410/156; 211/60.1; 211/4
[58] Field of Search .................... 410/31-34, 410/36, 42, 46-48, 156, 143, 153; 211/4, 8, 64, 70.2, 60.1, 63; 248/552; 224/917

[56] References Cited

U.S. PATENT DOCUMENTS

| | | | |
|---|---|---|---|
| 2,287,805 | 6/1942 | Johnson | 211/64 |
| 2,752,046 | 6/1956 | Levy | 211/4 |
| 2,855,108 | 10/1958 | Haapala | 211/64 |
| 2,881,925 | 4/1959 | Idoux | 211/70.2 |
| 3,105,666 | 10/1963 | Orr | 248/552 X |
| 4,063,646 | 12/1977 | Stahl, Jr. | 248/552 X |
| 4,155,458 | 5/1979 | Moline | 211/4 |

*Primary Examiner*—Robert B. Reeves
*Assistant Examiner*—Scott H. Werny
*Attorney, Agent, or Firm*—Sheldon & Mak

[57] ABSTRACT

A locking carrier for load-restraining bars comprises a base having a cavity for receiving an enlarged foot portion of the bar when the bar is aligned with its axis in a first direction, a member for holding the foot portion within the cavity when the bar is aligned with its axis in a second direction, a retainer for locking the bar with its axis aligned in the second direction. The base can be fastened to a truck-tractor vehicle for conveniently and securely carrying the bars with the tractor when they are not in use.

7 Claims, 8 Drawing Figures

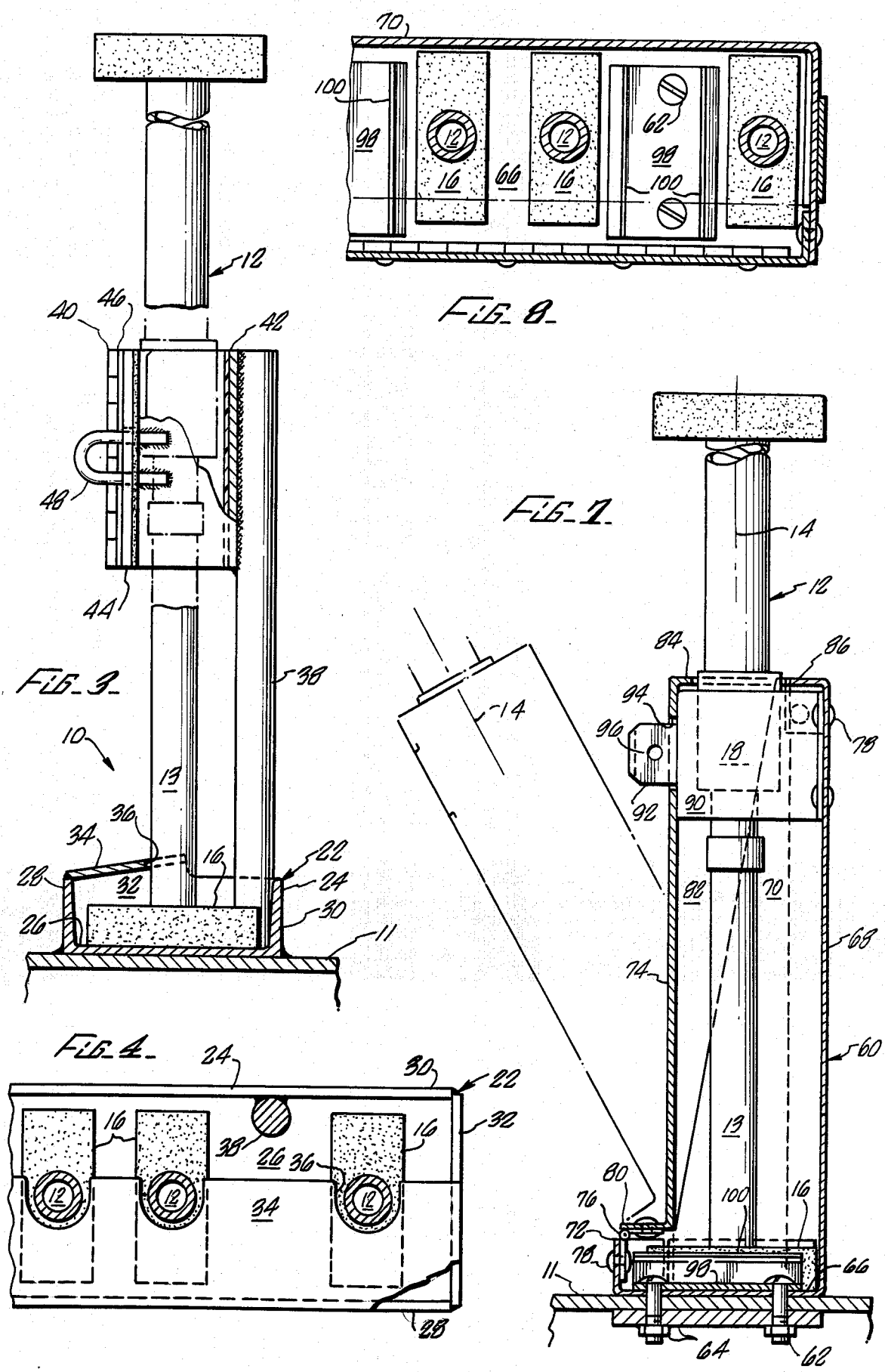

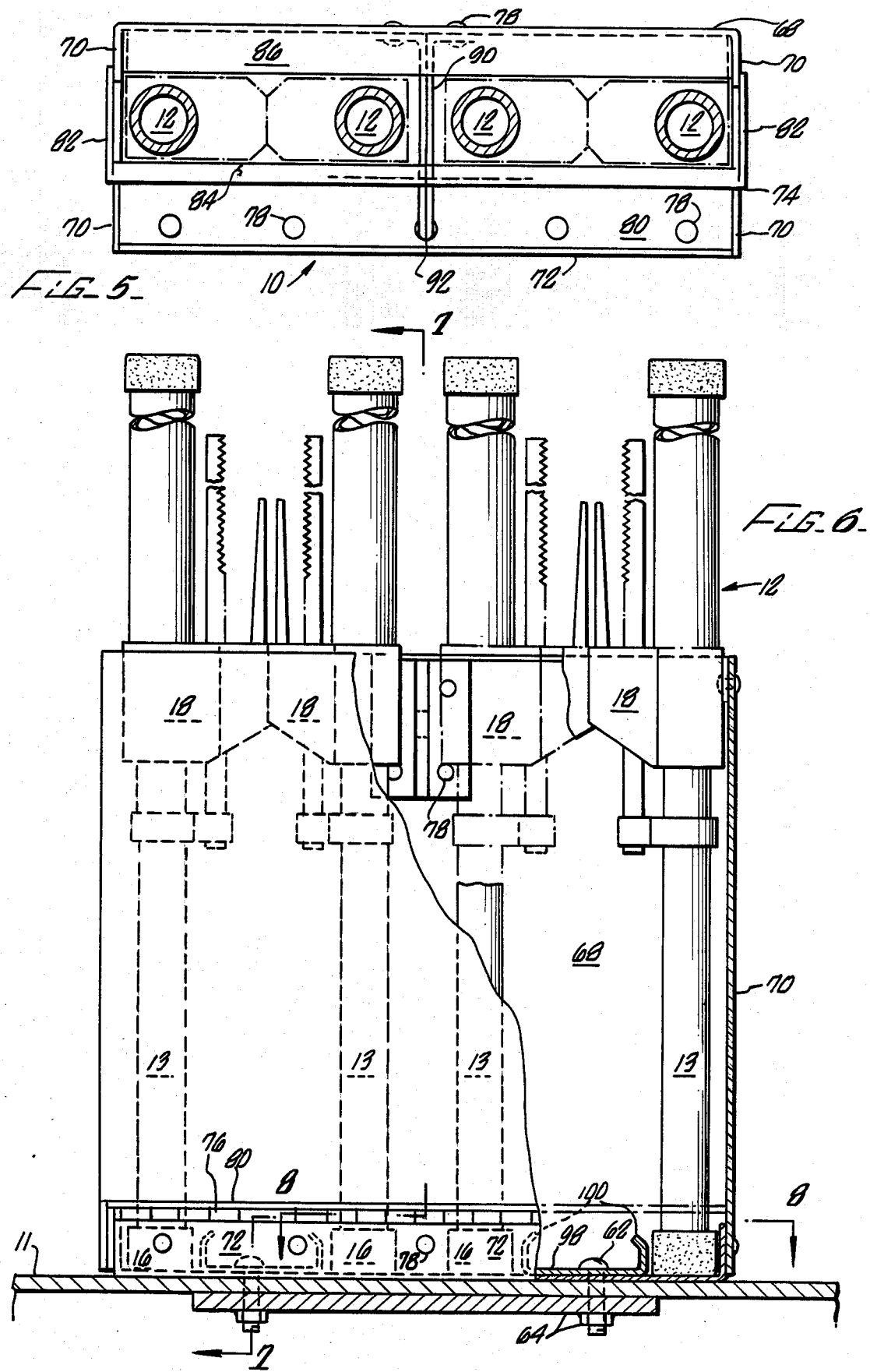

LOCKING LOAD BAR CARRIER AND METHOD

BACKGROUND

This invention relates to load handling devices for the trucking industry and more particularly to a locking carrier for load restraining bars.

Load bars are used in trucking for restraining partial loads of discrete goods within van trucks and trailers for preventing the goods from tumbling down into unused space when the truck is underway. A single load bar is sometimes effective for this purpose; however, they are usually used in pairs, a normal complement being two or four of the bars. Typically, there is common ownership of the load bars and a tractor for the trailers. However, the trailers are often owned separately. When the load bars are not in use, they are ordinarily carried within a trailer, because they do not fit within the cab of the tractor, and if they are tied on to the tractor external to the cab, they are likely to be lost or stolen. Load bars that fall onto the highway from truck tractors also present a serious safety hazard. Thus the trucker must retrieve his load bars from the trailer at the end of a run or risk losing them. This is impractical for a number of reasons, including:

1. There may not be space for the load bars in a trailer that is fully loaded;
2. There are times when a tractor is dead-headed without a trailer;
3. When several different trailers are used in sequence, there is extra work snifting the load bars from trailer to trailer, even when they are not being used; and
4. The load bars are easily forgotten and left behind when they are kept out of sight inside of a trailer.

Thus there is a need for a device for transporting a plurality of load bars on the chassis of a truck tractor without interfering with normal operation of a tractor, that can be securely locked for preventing a loss or theft of the load bars, and that is easy to use and inexpensive to produce and install.

SUMMARY

The present invention is directed to a locking load bar carrier that satisfies this need. The carrier, capable of holding at least one load-restraining device, comprises a base having a cavity for receivng a foot portion of the device when the device is aligned in a first orientation, means for holding the foot portion within the cavity when the device is aligned in a second direction, retaining means having open and closed positions for selectively retaining the device aligned in the second direction, and means for locking the retaining means closed.

Preferably the carrier includes four of the cavities for receiving and retaining four of the devices. Thus a practical complement of the devices fit in a single carrier.

Preferably each cavity comprises a supporting surface for the foot of the device and holding means for preventing lateral movement of the foot when it is proximate to the supporting surface. In one version of the present invention the holding means includes a barrier extending over a portion of the supporting surface for confining the foot proximate to the supporting surface when the device is aligned in the second direction.

In another version of the present invention, the holding means includes a movable element that is connected to the retaining means for facilitating entry and exit of the foot with respect to the cavity when the retaining means is in the open position. The movable element can be part of a door of the retaining means.

The carrier can be conveniently fastenened to the chassis of a truck tractor. In one version of the present invention, a nut-plate and a plurality of screws are provided for clamping a supporting member of the vehicle between the base and the nut-plate such that when the retaining means is locked in the closed position, at least two of the screws are inaccessible for preventing unauthorized removal of the carrier from the tractor. Alternatively, the carrier can be welded direcrly to the chassis of the tractor.

The present invention provides a method for carrying a load-restraining device on a vehicle comprising the steps of:

(a) selecting a carrier comprising:
  (i) a base having a cavity for receiving the foot portion when the axis of the device is aligned in a first direction;
  (ii) means for holding the foot portion within the cavity when the axis of the device is aligned in a second direction;
  (iii) means for retaining the device with its axis aligned in the second direction, the retaining means having an opened and a closed position; and
  (iv) means for locking the retaining means in the closed position;
(b) affixing the carrier to the vehicle;
(c) moving the retaining means to the open position;
(d) holding the device with its axis aligned in the first direction;
(e) inserting the foot member into the cavity;
(f) holding the device with its axis aligned in the second direction;
(g) moving the retaining means to the closed position; and
(h) locking the retaining means in the closed position.

The carrier of the present invention can be attached to the chassis of a tractor vehicle immediately behind a cab of the vehicle for transporting the load bars unobstrusively on the tractor, yet conveniently accessible for use when needed. The carrier is inexpensive to provide in that a bulky structure enclosing the load bars is not required; it is easy to install in that it can mount directly to the chassis of the tractor, requiring only a small amount of area thereon.

The carrier is easy to use in that operation of a single locking element provides ready access to all of the load bars.

DRAWINGS

These and other features, aspects, and advantages of the present invention will become better understood with reference to the following description, appended claims, and accompanying drawings where:

FIG. 3 is a fragmentary side elevational sectional view of the carrier of FIG. 1 taken along line 3—3 in FIG. 2.

FIG. 4 is a fragmentary sectional plan view of the carrier of FIG. 1 taken on line 4—4 in FIG. 2;

FIG. 5 is a fragmentary sectional plan view of a second version of the present invention;

FIG. 6 is a fragmentary front elevational section view of the carrier of FIG. 5;

FIG. 7 is a side elevational sectional view of the carrier of FIG. 5 taken on line 7—7 in FIG. 6; and FIG. 8 is a fragmentary plan sectional view of the carrier of FIG. 5 taken along line 8—8 in FIG. 6.

DESCRIPTION

Figure 1:
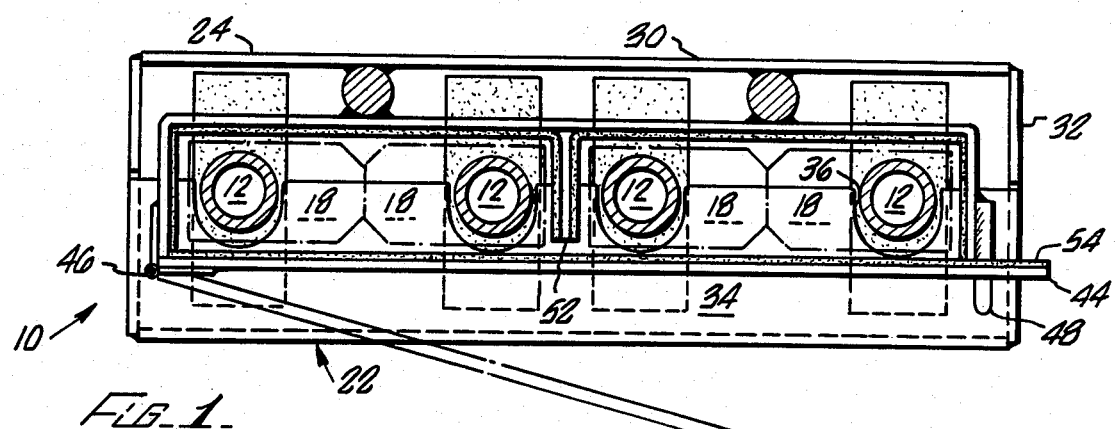
FIG. 1 is a fragmentary plan view of a first version of the present invention in use holding four load bars.
Figure 2:
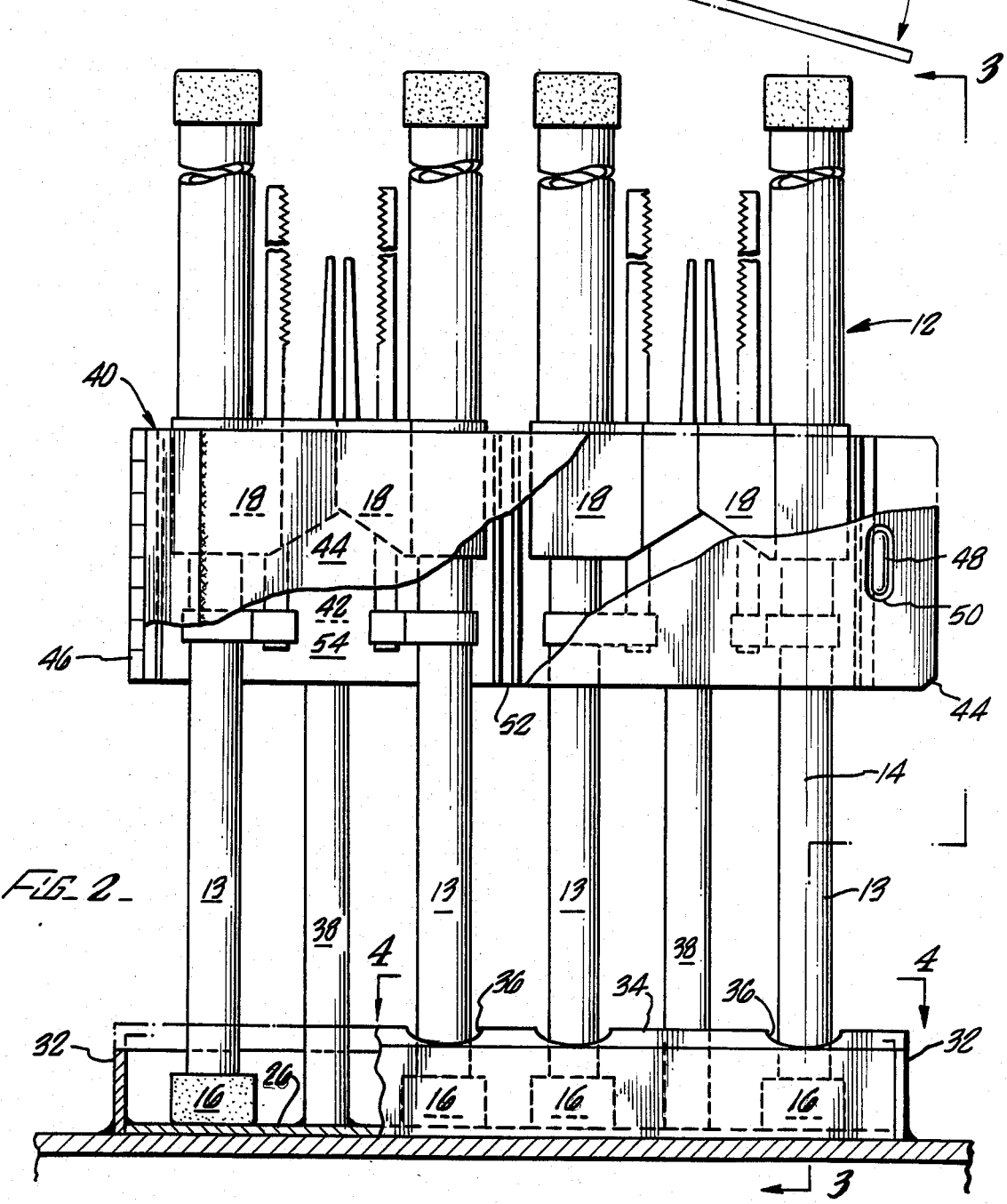
FIG. 2 is a fragmentary front elevational view of the carrier of FIG. 1.

The present invention is directed to a locking carrier for elongated load-restraining devices that are used in trucking for preventing unwanted shifting of loads within a van trailer. With reference to FIGS. 1-4, a locking carrier 10 rests on a horizontal chassis member 11 of a truck tractor vehicle (not shown). The carrier 10 holds vertically four of the load-restraining devices or load bars 12.

Each of the load bars 12 typically comprises an extension member 13 located along a bar axis 14 of the load bar 12. At each end of the load bar 12 is a foot 16, one of the feet 16 being attached to the extension member 13. An extension mechanism 18 provides a means for forcibly separating the feet 16 for clamping the load bar 12 between opposite walls of the van (not shown).

The carrier 10 of the present invention comprises a base 22, the base 22 being adapted for welding directly to the chassis member 11. The base 22 comprises an upwardly-facing channel member 24 that provides a cavity for the foot 16 that is attached to the extension member 13 of the load bar 12. The foor 16 rests on a web 26 that connects opposite vertically extending flanges of the channel member 24, the flanges being designated front flange 28 and rear flange 30.

A gusset member 32 joins the front flange 28 and the rear flange 30 at each end of the channel member 24. A barrier member 34, extending over a portion of the web 26, is supported by the front flange 28 and the gusset members 32. A locating slot 36 is provided in the barrier member 34 for engaging the extension member 13 of each of the load bars 12 in the carrier 10. The locating slots 36 are positioned proximate to the feet 16 for laterally confining the feet 16 within the channel member 24. When the bar axis 14 is oriented vertically, the barrier member 34 also holds the foot 16 downwardly, preventing the removal thereof from the channel member 24.

A pair of supporring bars or columns 38 extends upwardly from the channel member 24, each bar 38 being welded to the web 26 and the rear flange 34 thereof. A cage assembly 40 is attached to the tops of the bars 38 for confining the load bars 12 in a vertical orientation within the carrier 10.

The cage assembly 40 includes a forwardly facing U-shaped box member 42 and a hasp 44, the hasp 44 being attached at one side of the box member 42 by a ninge 46, the hinge 46 being welded to the box number 42 and the hasp 44. A loop member 48, welded to the box member 42 opposite the hinge 46, extends through a hasp slot 50 in the hasp 44 when the hasp 44 is closed against the box member 42. Thus the hasp 44 can be locked by a padlock (not shown).

The cage assembly 40 is positioned vertically above the channel member 24 for confining the load bars 12 vertically oriented within the carrier 10 when the extension members 13 of the load bars 12 are positioned within the corresponding locating slots 36 of the barrier member 34. When the hasp 44 is opened, the load bars 12 may be withdrawn from the carrier 10 by tipping each load bar 12 forwardly about the corresponding locating slot 36, releasing the foot 16 from the base 22.

Preferably the cage assembly 40 extends from about 8 inches to about 13 inches above the web 26 of the channel member 24 for enclosing a substantial portion of the extension mechanism 18 of each load bar 12. This is because the extension mechanisms 18 of the load bars 12 constitute an enlargement thereof, limiting the minimum spacing between the bar axes 14. A rib member 52, welded within the box member 42, separates the load bars 12 by pairs, enabling the cage assembly 40 to vertically retain pairs of the load bars 12 within the carrier 10.

A resilient coating 54 is applied to the interior of the cage assembly 40, covering the box member 42, the hasp 44, and the rib member 52 for cushioning the extension mechanisms 18 of the load bars 12 within the cage assembly 40.

With reference to FIGS. 5-8, a second version of the locking carrier 10 of the present invention comprises a housing 60 for enclosing a lower portion of the load bars 12, including the extension member 13, the foot 16 attached thereto, and at least a portion of the extension mechanism 18. A plurality of mounting screws 62 are provided for clamping the chassis member 11 between the housing 60 and a nut-plate 64, as further described below. The housing 60 is fabricated from sheet metal, including a floor member 66 for mounting to the chassis member 11, a back member 68 extending upwardly therefrom, and a pair of side members 70 for rigidly locating the back member 68. A front member 72 extends upwardly a short distance above the floor member 66 opposit the back member 68.

A vertically extending door 74 is pivotably mounted to the housing 60 at the top of the front member 72 by a door hinge 76, the door hinge 76 being attached to the housing 60 and the door 74 by a plurality of rivets 78. A bottom flange 80 of the door 74 extends rearwardly from the hinge 76 for offsettting the vertically extending door 74 rearwardly from the front member 72. The door 74 has rearwardly extending side flanges 82 on opposite sides thereof, and a rearwardly extending top flange 84 for stiffening the door 74, the top flange 84 also restraining forward movement of the load bar 12 proximate to the extension mechanism 18. A top member 86 extends forwardly from the top of the back member 68 opposite the top flange 84 for restraining rearward motion of the load bar 12 proximate to the extension mechanism 18.

The door 74 closes against a bulkhead 90, the bulkhead 90 extending forwardly from a point proximate to the top of the back member 68, the bulkhead 90 being fastened thereto by a plurality of the rivets 78. A tongue 92 of the bulkhead 90 extends through a tongue slot 94 in the door 74. The tongue 92 has a lock hold 96 for a padlock (not shown) for locking the door 74 in the closed position.

A pair of the load bars 12 can be placed vertically on each side of the bulkhead 90, the extension members 13 extending downwardly between the back member 68 and the door 74, the feet 16 thereof resting on the floor member 66. Wnen the door 74 is in the closed position, the bottom flange 80 of the door 74 extends over a portion of the feet 16, holding the feet 16 proximate to the floor 66, thereby preventing removal of the load bars 12 from the carrier 10. When the door is opened, the bottom flange 80 swings out of the way, allowing the load bars 12 to be removed from the carrier 10.

A channel member 98 is fastened to the floor member 66 by a pair of the mounting screws 62 for preventing excessive lateral movement of the feet 16 within the carrier 10. The channel 98 has a pair of upwardly extending flanges 100, the top of each flange 100 being angled away from a corresponding foot 16 for guiding the foot 16 into position on the floor member 66 when the load bar 12 is inserted into the carrier 10. The back member 68, the front member 72, the side members 70, and the channels 98 laterally restrain the feet 16 of the load bars 12, the combination providing cavities for the feet 16. Similarily, the side members 70 and the top member 86 of the housing 60, and the top flange 84 of the door 74, plus the bulkhead 90 provide lateral restraint for pairs of the load bars 12 proximate to the extension mechanisms 18 thereof. Thus, when the door 74 is closed, the load bars 12 are positively retained within the carrier 10, the bar axes 14 thereof being oriented vertically.

At least two of the mounting screws 62 are located under the bottom flange 80 so that wnen the door 74 is closed and locked, the screws 62 are inaccessible. Thus the carrier 10 is secure against unauthorized removal from the chassis member 11, and the load bars 12 are safely carried externally on the tractor.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. a locking carrier for at least one elongated load-restraining device, the device having a longitudinal axis and an enlarged foot member at one end thereof, the carrier comprising:
    (a) a base having a cavity for receiving the foot member when the axis of the device is aligned in a first direction, the cavity having a supporting surface for the foot member and means for preventing lateral movement of the foot member when the foot member is proximate the supporting surface;
    (b) means for holding the foot member within the cavity when the axis of the device is aligned in a second direction;
    (c) means for retaining the device with its axis aligned in the second direction, the retaining means having an open and a closed positions; and
    (d) means for locking the retaining means in the closed position,
    wherein the holding means includes a moveable element for engaging the foot member, the moveable element being connected to the retaining means for facilitating movement of the foot member into and out of the cavity when the retaining means is in the open position.

2. The carrier of claim 1 including four of the cavities for receiving and retaining four of the devices.

3. The carrier of claim 1 fastened to a truck tractor vehicle.

4. The carrier of claim 1 including a plurality of screws and a nut-plate for fastening the carrier to a truck tractor vehicle, a member of the vehicle being clamped between the carrier and the nut-plate, the screws protruding one wall of the carrier and engaging the nut-plate,
    wherein when the retaining means is locked in the closed position, at least two of the screws are covered for preventing removal of the screws from engagement with the nut-plate.

5. A locking carrier for at least one pair of elongated load-restraining devices, each device having a longitudinal axis and an enlarged foot member at one end thereof, the carrier comprising:
    (a) a housing comprising:
        (i) a cavity having a supporting surface for each foot member;
        (ii) means for preventing lateral movement of the foot member when the foot member is proximate to the supporting surface; and
        (iii) means for preventing sideward and rearward movement of each axis from a vertical orientation;
    (b) a door pivotable mounted to the housing, the door having open and closed positions, the door comprising:
        (i) means for holding each foot member proximate to the supporting surface when the door is in the closed position, the holding means including an element for engaging the foot member;
        (ii) means for preventing forward movement of each axis from a vertical orientation when the door is in the closed position;
        (iii) means for releasing the devices from the carrier when the door is in the open position, the releasing means including the element of the holding means moving away from the foot member for facilitating movement of the foot member into and out of the cavity when the door is moved from the closed position to the open position; and
    (c) means for locking the door in the closed position.

6. The carrier of claim 5 wherein the door is pivoted from proximate the bottom of the carrier, the door extending upwardly therefrom when the door is in the closed position.

7. A method for carrying at least one elongated load-restraining device on a vehicle, the device having an axis and an enlarged foot member at one end thereof, the method comprising the steps of:
    (a) selecting a carrier comprising:
        (i) a base having a cavity for receiving the foot member when the axis of the device is aligned in a first direction, the cavity having a supporting surface for the foot member and means for preventing lateral movement of the foot member when the foot member is proximate the supporting surface;
        (ii) means for holding the foot member within the cavity when the axis of the device is aligned in a second direction, the holding means having a movable element for engaging the foot member and selectively preventing movement of the foot member away from the supporting surface;
        (iii) means for retaining the device with its axis algined in the second direction, the retaining means being connected to the movable element and having an open and a closed position; and
        (iv) means for locking the retaining means in the closed positions;
    (b) affixing the carrier to the vehicle;
    (c) moving the retaining means to the open position so that the movable element is positioned for facilitating entry of the foot member into the cavity;
    (d) holding the device with its axis aligned in the first direction;
    (e) inserting the foot member into the cavity;

(f) holding the device with its axis aligned in the second direction;

(g) moving the retaining means to the closed position against the device at a point located away from the foot member, the retaining means moving the movable element so that the movable element is positioned over the foot member for preventing movement of the foot member away from the supporting surface; and (h) locking the retaining means in the closed position.

* * * * *